W. T. FIELD & J. A. DUMBOLTON.
GREASE GUN.
APPLICATION FILED AUG. 4, 1914.

1,224,914.

Patented May 8, 1917.

UNITED STATES PATENT OFFICE.

WILLIAM T. FIELD AND JOHN A. DUMBOLTON, OF LINCOLN, NEBRASKA.

GREASE-GUN.

1,224,914. Specification of Letters Patent. Patented May 8, 1917.

Application filed August 4, 1914. Serial No. 855,015.

*To all whom it may concern:*

Be it known that we, WILLIAM T. FIELD and JOHN A. DUMBOLTON, citizens of the United States, residing at Lincoln, in the county of Lancaster and State of Nebraska, have invented new and useful Improvements in Grease-Guns, of which the following is a specification.

This invention relates to grease guns, the object in view being to produce a gun which is adapted to be charged with grease by air or weight under pressure and in which the gun is adapted to be unloaded also by air or weight under pressure, the broad object of the invention being to produce a grease gun which is adapted to be charged with grease by air or weight under pressure.

With the above and other objects in view, the invention consists in the novel construction, combination and arrangement of parts, as herein described, illustrated and claimed.

In the accompanying drawings:—

Figure 1:
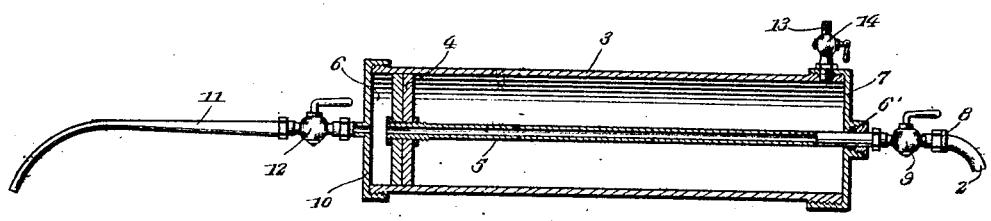
Figure 1 is a longitudinal section through a grease gun embodying the present invention.
Figure 2:
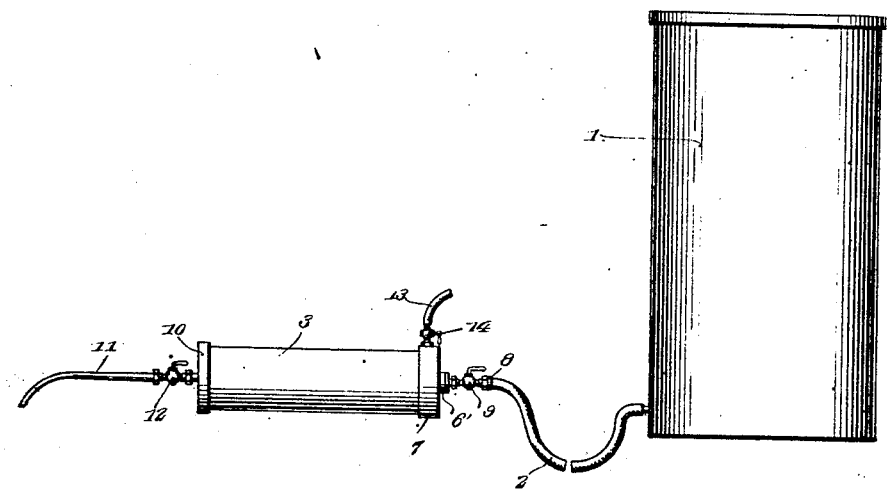
Fig. 2 is a side elevation of the grease gun on a reduced scale, showing a reservoir of grease to which the gun is connected by a flexible pipe or hose.

Referring to the drawings 1 designates a receptacle for grease, said receptacle being also adapted to contain air under pressure by means of which the grease contained in said receptacle is forced into the grease gun hereinafter particularly described, 2 designating a flexible pipe or hose through which the grease is discharged from the receptacle 1 and which conveys the grease to the gun.

The gun comprises a hollow cylinder 3 in which is a plunger 4 of any suitable description, said plunger being mounted on one end of a tubular plunger rod 5, said rod extending through the plunger 4 so as to communicate with the grease containing chamber 6 of the cylinder 3.

The tubular plunger rod 5 passes slidably through a stuffing box 6' in the head 7 of the cylinder and is formed at 8 to receive the flexible pipe or hose 2 above referred to. Exteriorly of the cylinder 3 the plunger rod 5 is provided with a stop cock 9.

From the opposite head 10 of the cylinder projects a discharge nozzle 11 which is controlled by a stop cock 12. Adjacent to the head 7 of the cylinder 3 is an air inlet and outlet nozzle or connection 13 which is controlled by a stop cock 14.

In charging the grease gun, the cock 12 is closed, the cock 9 is opened and also the cock 14. This allows the grease from the receptacle 1 to be forced by air pressure through the tubular plunger rod 5 into the space 6 in the cylinder below or beyond the plunger 4, the grease acting as it fills the chamber 6 to force back the plunger 4, the air displaced from the cylinder exhausting through the nozzle or connection 13.

To express the grease from the gun, the cock 12 is opened, the cock 9 closed and the cock 14 opened. Air under pressure is now introduced through the nozzle or connection 13, acting on the back of the plunger 4 to force the same toward the discharge end of the cylinder 3, the grease being forced out through the discharge nozzle 11.

It will of course be understood that the gun may be manufactured in various sizes and of any capacity in accordance with the use to which it is to be put. We therefore do not desire to limit ourselves to the proportions or exact details shown, reserving the right to make such changes in the form, proportion and minor details of construction as properly fall within the scope of the appended claim. The gun is particularly adapted for handling grease now known on the market as "fluid" or "semi-fluid".

What we claim is:—

A grease gun adapted to operate by compressed air and comprising a hollow cylindrical air and grease container, a plunger movable therein, a tubular plunger rod extending through the plunger and one end of the container through which the grease is adapted to be forced under pressure to charge said container between the plunger and the grease outlet, a discharge nozzle at one end of said container, stop cocks controlling said plunger rod and discharge nozzle, and a cock-controlled compressed air inlet and outlet communicating with said container behind the plunger.

In testimony whereof we affix our signatures in presence of two witnesses.

WILLIAM T. FIELD.
JOHN A. DUMBOLTON.

Witnesses:
A. W. MILLER,
GERTRUDE JACKSON.